Patented Jan. 6, 1942

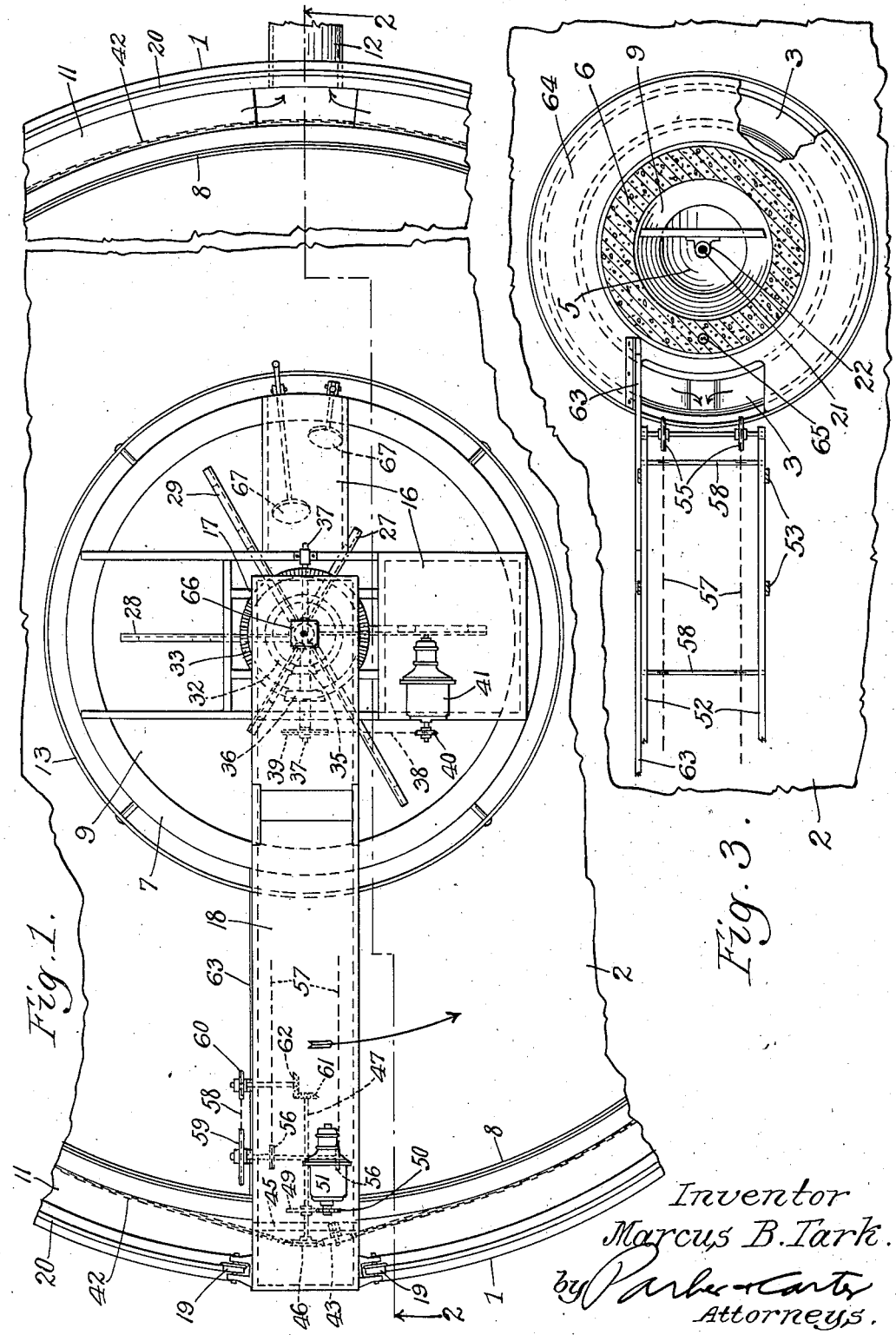

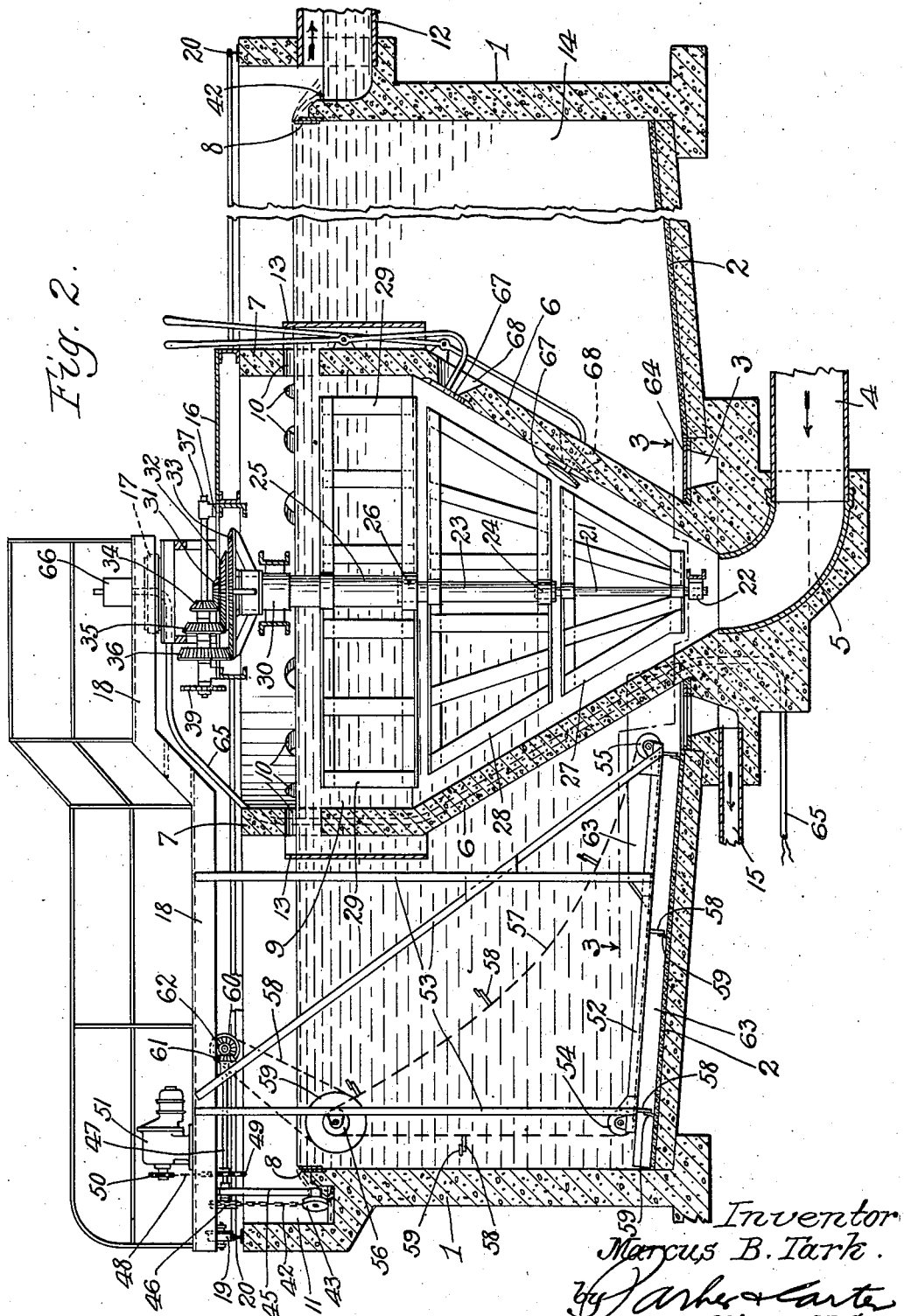

2,268,726

UNITED STATES PATENT OFFICE 2,268,726

FLOC CONCENTRATION TANK

Marcus B. Tark, Philadelphia, Pa., assignor to Link-Belt Company, Chicago, Ill., a corporation of Illinois Application October 14, 1938, Serial No. 234,912

20 Claims. (Cl. 210—16)

My invention relates to apparatus for the treatment by flocculation and sedimentation of liquids containing solids or colloids or both in suspension or solution. It has for one object to provide an apparatus suitable to carry out a continuous process whereby in one organized mechanism liquids either with or without chemical dosage may be flocculated or coagulated and the flocs may be precipitated out so that a clarified effluent may be obtained and so that a concentrated sludge may be withdrawn.

Another object of the invention is to provide means to insure that the maximum possible proportion of solids and colloids may be removed from the liquid.

Other objects will appear from time to time throughout the specification and claims.

My invention is illustrated more or less diagrammatically in the accompanying drawings, wherein—

Figure 1 is a plan view;

Figure 2 is a section along the line 2—2 of Figure 1;

Figure 3 is a section along the line 3—3 of Figure 2.

Like parts are indicated by like characters throughout the specification and drawings.

1 is a cylindrical sedimentation or settling tank, though other suitable shapes may be used, having a floor 2, slightly inclined downwardly from the periphery toward the center, though the inclination may be varied or the floor may even be horizontal. 3 is an annular sludge hopper encircling but spaced from the center of the tank, though the hopper may be of different shape or arrangement. 4 is an influent pipe beneath the floor 2, of the tank and discharging through any suitable means as the elbow 5, into the tank at the bottom. 6 is a conical wall extending upwardly from the bottom of the tank concentric with and communicating with the elbow 5, and outwardly flared or expanded. The wall 6 terminates in an upwardly extending annular wall 7, which extends above the level of the liquid in the tank.

The liquid level is controlled by the effluent weir 8, so that the liquid entering the tank through the pipe 4, the elbow 5, into the upwardly expanded flocculating chamber 9, defined by the conical wall 6, and the annular wall 7, may pass outwardly into the body of the tank 1, through a series of evenly spaced outlet ports 10, and thence may flow radially to discharge over the weir 8.

11 is an annular trough encircling the weir 8, communicating with an effluent pipe 12. 13 is a deflector or baffle plate mounted on the wall 7, and masking the outlet ports 10 so as to insure an even distribution of the effluent as it is discharged from the flocculating chamber 9, into the sedimentation chamber 14, within the tank 1, and encircling the flocculating chamber 9. The outlet ports 10, may be continuous or as in the preferred form evenly spaced about the entire periphery of the wall 7. 15 is a sludge discharge pipe leading from the sludge hopper 3, outwardly beneath the floor of the tank.

16 is a fixed bridge supported upon the wall 7, and extending across the center of the tank. This bridge supports a turntable 17, upon which is rotatably mounted the inner end of a traveling or rotating bridge 18. The bridge is supported at its outer end on wheels 19, traveling along the track 20, on the outer periphery of the tank 1, so that access may be had to the fixed bridge 16 and the machinery associated with it by means of the rotating bridge 18.

21 is a high speed central shaft supported at its lower end in a bearing 22, adjacent the bottom of the flocculating chamber 9, extending upwardly to the bridge 16. 23 is an intermediate speed hollow shaft encircling the shaft 21, having a bearing 24 thereon at its lower end and extending upwardly to the bridge 16. 25 is a low speed shaft extending upwardly to the bridge 16. 27 is a high speed paddle mounted on the high speed shaft 21, at the bottom of the flocculating chamber. 28 is an intermediate speed paddle, mounted on the hollow shaft 23, intermediate the top and bottom of the flocculating chamber. 29 is a low speed paddle mounted on the shaft 25, adjacent the top of the flocculating chamber.

The shafts 21, 23 and 25, concentric one with another are positioned at the top by a bearing 30, there being bearing members inside the shafts so that they are free to rotate with respect one to another. 31 is a miter gear on the upper end of the shaft 21. 32 is a miter gear on the upper end of the shaft 23. 33 is a mitre gear on the upper end of the shaft 25. These gears are meshed respectively with the miter pinions 34, 35 and 36, on the drive shaft 37, which is driven by a chain 38, over the sprockets 39 and 40, and driven by a motorized speed reducer 41, on the bridge 16. The relative diameters of miter gears and pinions are selected so that the speed of rotation of the inner shaft is a maximum and of the outer shaft is a minimum and of the intermediate shaft is between the two so that the lower paddles rotate more rapidly than the intermediate and the intermediate more rapidly than the upper, the particular speed relationship being controlled by the relative diameters of the gears and pinions. The motorized speed reducer is adapted to be adjusted to give the desired speed for all of the paddles.

42 is an endless traction drive chain located in the trough 11. 43 is an idle pulley supported on a bracket 45, depending downwardly from the bridge 18. 46 is a drive pulley over which the chain 42 travels. The idler pulley 43 guides the chain as it comes up out of the trough to the drive pulley 46. The chain after it has passed over the trough pulley is slack and no guide means are needed to insure its return to the trough. The drive pulley 46 is mounted on a shaft 47, which is driven by means of chains 48, and sprockets 49 and 50, by the motorized speed reducer 51. This motor rotating the shaft 47, causes the bridge to rotate about its pivot point by exerting a tension on the chain, the friction of the chain on the walls and floor of the effluent trough 11 being sufficient to drive the bridge.

52 is a sludge collector ladder. It is supported by the framework 53, from the bridge 18, and the ladder and framework carry idler sprockets 54, 55, and drive the sprocket 56 over which travels the conveyor chain 57. This chain carries a plurality of conveyor flights 58, the flights being supported on the ladder 52, at a point sufficient to just clear the floor of the tank. They may be equipped with rubber or other squeegee blades 59, to insure that the flights as they move inwardly along the ladder 52 will scrape settled sludge from the bottom of the tank. The sprocket 56 is driven by chain 58, and sprockets 59, 60 and miter gears 61, 62 from the shaft 47, so that whenever the bridge 18 travels about the tank, the sludge collecting flights will move inwardly toward the center of the tank in unison therewith. 63 is a sludge plow carried by the ladder 52, at one side of the path of the flights 58, so that as the flights are moved into the settled sludge, the sludge is moved inwardly by the flights and kept in the path of the flights by the sludge plow 63, which extends radially from the outer periphery of the settling tank to the flocculation tank. 64 is a rotating cover for the sludge hopper 3. It is connected to the sludge plow and as the sludge plow travels around the rotating cover also rotates. This cover is apertured in line with the sludge collecting flights so that as the sludge is fed centrally by the flights, it is discharged into the sludge hopper but there is no sludge deposition and no escape of sludge from the hopper at any other point except through the sludge pipe beneath the floor of the tank.

65 is an electric conduit extending beneath the floor of the tank and upwardly through the wall of the flocculating chamber thence inwardly to the current collector 66, whence a conductor leads to the motorized speed reducers 41 and 51, and to furnish power to operate them.

I have shown both the flocculating or mixing chamber and the settling or sedimentation chamber as circular and concentric. They might, of course, be of any other shape. They are not necessarily concentric. They might even be separately located side by side.

I have shown the mixing chamber as being conical and terminating in a cylindrical portion. It might be other than conical and the cylindrical portion might be dispensed with. I have shown the wall of the cylindrical portion extending upwardly above the liquid level. In effect, it is a weir and its purpose is to provide an adequate space for the flow at low velocity, of the mixed and flocculated liquid containing large flocs from the mixing chamber into the settling chamber at such rate of speed that the flocs will not be broken up and will settle rapidly and easily in the sedimentation chamber.

67, 67 are bleeder valves controlling ports 68 in the wall of the mixing chamber. They communicate directly with the sedimentation or settling chamber and their purpose is to permit running off of additional floc from below the normal floc blanket at the top of the mixing chamber if there should at any time be too great a concentration of floc. Such floc being discharged into the sedimentation chamber at a point far below the liquid level and adjacent the center, will, of course, settle and be carried out with the remaining floc, settled as sludge, which entered from the normal outlet ports.

The use and operation of my invention are as follows:

The liquid which is to be treated is dosed with a suitable coagulant or chemical or other material adapted to promote flocculation or coagulation of the solids and colloids which are in suspension or in solution in the liquid. If desired, the dosed liquid may be given a preliminary mixing, after or without such preliminary mixing it is then introduced into my apparatus through the influent pipe 4, entering the system at the relatively small conical bottom of the flocculating or mixing chamber where the mixture is violently agitated and mixed.

The liquid flows upwardly through the mixing chamber at gradually reduced speed owing to the upward expansion of the chamber and is agitated and mixed in the intermediate zone though less violently than in the preliminary mixing zone. As the liquid continues its upward flow it reaches the zone of maximum cross sectional area of the flocculating chamber where it encounters a sludge blanket formed by gradually accumulating and coagulating flocs from the liquid. This blanket is constantly renewed by the addition of flocs from below and there is a constant discharge of large flocs from the upper portion of the blanket accompanied by the liquid which has been strained through the blanket.

The flocs commence to form, probably as pin flocs, localized in the liquid as it enters the system. The violent agitation mixes the sewage and chemicals and promotes the formation of more pin flocs throughout the entire mass. Then as the agitation decreases in consonance with the upward flow at gradually decreasing velocity of the liquid larger and larger flocs are formed until the floc blanket is reached where the remaining small flocs are combined with the larger ones to form the relatively thick blanket of relatively large coagulated particles or flocs.

This floc blanket remains generally constant in thickness and density because the large flocs which flow off with the liquid are constantly being replaced by flocs from below.

These large flocs pass down around the outer periphery of the mixing or flocculating chamber into the sedimentation chamber below the encircling baffle. The velocity of flow is materially reduced and the liquid in the sedimentation chamber is in a substantially quiescent condition. Thus those flocs which have been initially discharged into the sedimentation chamber from beneath the baffle tend to settle out, the clarified liquid flowing over the effluent weir.

The flocs which settle as sludge on the floor of the sedimentation chamber are collected by the sludge plow and the flight conveyors as the sludge plow rotates about the center of the tank and the flight conveyors move inwardly toward the center. The sludge thus collected is discharged into the opening through the annular cover of the sludge hopper and thence withdrawn through the sludge pipe. Since the annular cover is connected to the sludge plow, it rotates with it. The sludge hopper is always closed except at the point where it receives the sludge discharged from the flight conveyor.

If the floc blanket should become too thick, and extend down too far into the flocculating or mixing chamber, the bleeder ports in the wall of the flocculating chamber may be opened to permit more of the flocs to flow directly into the sedimentation chamber far below the surface of the liquid. Such flocs will be free to settle in the quiescent body of liquid in the sedimentation chamber and will be carried off as sludge just as are the flocs which enter the sedimentation chamber through the distribution ports at the top of the mixing chamber.

The treatment of sewage by flocculation or coagulation is of long standing. Experience has taught that under some circumstances, especially when very fine solids or colloids are in suspension, merely arresting the flow of the liquid in a quiescent body is not sufficient to permit adequate clarification by sedimentation because the material is so finely divided that it will not settle out in a reasonable length of time. When this is the case, flocculation or coagulation must be resorted to.

Flocculation or coagulation means applying some kind of treatment to the liquid which will cause the fine materials therein to be concentrated or accumulated and form large flocs which will settle out.

Sometimes this coagulation may be effected by agitation alone. In other cases, it is necessary to provide some additional material with which the sewage may be dosed to promote floc formation.

An important step in the treatment of sewage liquids by flocculation is the formation somewhere in the system of a floating floc blanket through which the liquid may pass.

The effect of such a floc blanket is to strain out the fine, substantially unsettleable flocs from the liquid, and to permit the liquid to carry away into the sedimentation or settling zone only flocs large enough for effective settling.

Such a blanket is an exceedingly delicate thing. If the velocities are too low, it will settle out. If the velocities are too high, it will be broken up or carried away. Suitable velocities are within a range of one to five feet per minute. Some kind of agitation is essential because the small flocs must be moved about and brought into contact with one another so that they may agglomerate to form large flocs. Without stirring or mixing or agitation the flocculating effect is exceedingly slow and uncontrollable. Too much agitation breaks the flocs up.

If the flow of current of the liquid being treated alone is relied upon, trouble is likely to ensue because ordinarily the flow rate changes from time to time.

My apparatus while it takes advantage of the flow of the liquid, at the same time superimposes upon it a controlled rate of agitation and stirring so that proper flocculation always takes place and so that the sludge blanket may be continuously formed and renewed. The violent agitation at the bottom of the tank promotes the necessary mixing and the progressively decreasing violence of agitation as the material flows upwardly permits the flocs to contact one another and coagulate and the rate of agitation at the top of the tank is low enough so that the floc blanket is not broken up.

Under some circumstances, the paddles which I have shown may be omitted. Under some circumstances only the low speed paddle may be operated. Under other circumstances stationary or revolving paddles may be used to distribute the liquid uniformly over the cross sectional area of the tank.

I prefer to arrange the mixing or floc concentration tank in the center of the settling tank because thus it is easy to convey the flocs without breakage to the sedimentation tank.

The mixing paddles I have shown are merely examples of a suitable type of agitating means. Other agitating devices might be used. Water jets or air diffusers, other types of paddles, any and all of them can be used and are well-known in the art as being used to provide the agitation necessary for flocculation of sewage and similar materials according to my invention. I wish, therefore, that my showing be regarded as in a sense diagrammatic and not limited to the specific mechanical details disclosed.

While my invention is illustrated by a concrete upwardly expanding flocculation chamber, obviously it may be made of any other suitable material, wood, sheet metal or the like. While I have shown a cylindrical wall extending upwardly from the point of maximum diameter of the cone, the wall is primarily a structural element. The device might very well operate if this wall were omitted and the liquid were allowed to flow over the upper edge of the cone into the sedimentation chamber, the essential thing in that respect being that the area through which the liquid and flocs travel from the flocculation to the sedimentation chamber is large enough so that the flow will be exceedingly gentle whereby the flocs are not broken as they travel from one chamber to the other.

I claim:

1. Apparatus for clarifying liquids including a floc concentration chamber, means for passing liquid through said chamber, mechanical means for agitating and mixing the liquid and for forming a blanket of floc particles within the chamber and means for withdrawing liquid from the chamber after it has passed through the blanket and for withdrawing flocs from the upstream portion of the blanket, means for settling the floc out of said liquid and for collecting the flocs thus settled.

2. Apparatus for clarifying liquids including a floc concentration chamber, means for passing liquid through said chamber, means independent of the rate of flow of liquid through the chamber for agitating and mixing the liquid and for forming a blanket of floc particles within the chamber and means for withdrawing liquid from the chamber after it has passed through the blanket and for withdrawing flocs from the upstream portion of the blanket, means for settling the floc out of said liquid and for collecting the flocs thus settled.

3. Apparatus for clarifying liquids including a floc concentration chamber, means for passing liquid through said chamber, means independent of the rate of flow of liquid through the chamber for agitating and mixing the liquid and for forming a blanket of floc particles with the chamber and means for withdrawing liquid from the chamber after it has passed through the blanket, and means for withdrawing flocs from the chamber on the downstream side of the blanket, a sedimentation chamber and a connection between it and the floc concentration chamber on the downstream side of the blanket, means within the sedimentation chamber for collecting material settled therein.

4. Apparatus for clarifying liquids including a floc concentration chamber, means for passing liquids therethrough, a plurality of stirring paddles in the chamber in the path of the liquid, means for operating the upstream paddle at relatively high speed, the downstream paddle at relatively low speed and the intermediate paddle at intermediate speed.

5. Apparatus for clarifying liquids including a floc concentration chamber, means for passing liquids therethrough the cross sectional area of the chamber increasing in the direction of such liquid flow, a plurality of stirring paddles in the chamber in the path of the liquid, means for operating the upstream paddle at relatively high speed, the downstream paddle at relatively low speed and the intermediate paddle at intermediate speed.

6. Apparatus for clarifying liquids including a floc concentration chamber, means for passing liquids therethrough, the cross sectional area of the chamber increasing in the direction of such liquid flow, means within the chamber independent of the rate of flow of liquid therethrough for imparting to the liquid an agitation the violence of which decreases in the direction of flow.

7. Flocculation apparatus including an upwardly expanding flocculation chamber having an influent opening at the bottom and an effluent opening at the top, means for agitating the liquid as it flows upwardly through the chamber.

8. Flocculation apparatus including an upwardly expanding flocculation chamber having an influent opening at the bottom and an effluent opening at the top, mechanically operated means for agitating the liquid as it flows upwardly through the chamber.

9. Flocculation apparatus including an upwardly expanding flocculation chamber having an influent opening at the bottom and an effluent opening at the top, means for agitating the liquid as it flows upwardly through the chamber, said means being adapted to impart to the liquid, an agitation the intensity of which decreases in the direction of travel of the liquid.

10. Sedimentation and flocculation apparatus including an upwardly expanding flocculation chamber having an influent opening at the bottom and an effluent opening at the top, and means for agitating the liquid as it flows upwardly through the chamber, and a sedimentation chamber encircling the flocculation chamber, there being a plurality of effluent apertures between the flocculation and the sedimentation chamber.

11. Sedimentation and flocculation apparatus including an upwardly expanding flocculation chamber having an influent opening at the bottom and an effluent opening at the top, means for agitating the liquid as it flows upwardly through the chamber, said means being adapted to impart to the liquid, an agitation the intensity of which decreases in the direction of travel of the liquid, and a sedimentation chamber encircling the flocculation chamber, there being a plurality of effluent apertures between the flocculation and the sedimentation chamber.

12. Sedimentation and flocculation apparatus including an upwardly expanding flocculation chamber having an influent opening at the bottom and an effluent opening at the top, and means for agitating the liquid as it flows upwardly through the chamber, and a sedimentation chamber encircling the flocculation chamber, there being a plurality of effluent apertures between the flocculation and the sedimentation chamber, and means for mechanically collecting settled sludge from the sedimentation chamber.

13. An apparatus for clarifying liquids including a floc concentration chamber, means for passing liquid therethrough, mechanical means in the chamber for agitating and mixing the liquid and for forming and locating a blanket of floc particles extending substantially completely across the line of flow of the liquid, a sedimentation chamber, means for continuously withdrawing liquid, containing floc, after it has passed entirely through the floc blanket, from the floc concentration chamber and discharging it to the sedimentation chamber, and manually controllable means for withdrawing floc from the upstream side of the floc blanket and separately discharging such floc to the same sedimentation chamber.

14. An apparatus for clarifying liquids including a generally cylindrical sedimentation chamber, an effluent passage discharging therefrom, a floc concentration chamber extending upwardly from the center of the floor, of the sedimentation chamber, out of contact with the walls thereof, and increasing in cross sectional area from the bottom upwardly, an influent pipe adapted to supply liquid to the bottom of the floc concentration chamber, a connection between the upper portions of the two chambers, a sludge hopper in the floor of the sedimentation chamber, encircling the floc concentration chamber, mechanical means for collecting and propelling settled sludge toward and discharging it into the sludge hopper, a plurality of agitating paddles arranged one above the other extending from the bottom of the floc concentration chamber upwardly, means for separately rotating each paddle at a speed less than the speed of rotation of the one below it, there being a free and substantially unobstructed passage upwardly from each paddle to the next one.

15. An apparatus for clarifying liquids including a generally cylindrical sedimentation chamber, an effluent passage discharging therefrom, a floc concentration chamber extending upwardly from the center of the floor of the sedimentation chamber, out of contact with the walls thereof, and increasing in cross sectional area from the bottom upwardly, an influent pipe adapted to supply liquid to the bottom of the floc concentration chamber, a connection between the upper portions of the two chambers, a sludge hopper in the floor of the sedimentation chamber, encircling the floc concentration chamber, mechanical means for collecting and propelling settled sludge toward and discharging it into the sludge hopper, a plurality of agitating paddles arranged one above the other extending from the bottom of the floc concentration chamber upwardly, means for separately rotating each paddle at a speed less than the speed of rotation of the one below it, there being a free and substantially unobstructed passage upwardly from each paddle to the next one, and manually controlled means for discharging floc from the floc concentration chamber into the sedimentation chamber at a point below the connection between the upper portions.

16. An apparatus for clarifying liquids including a floc concentration chamber, means for passing liquids therethrough, a plurality of paddles in the chamber in the path of the liquid, and means for rotating them in planes perpendicular to the line of travel of the liquid through the chamber, there being a free and substantially unobstrutced passage from one paddle to the next one, means for rotating each paddle at a speed less than the speed of the adjacent upstream paddle, the low-speed paddle and the walls of the chamber defining an area wherein the liquid is relatively quiescent to form and locate a floc blanket, and means for withdrawing the floc containing liquid from the chamber after it has passed through said blanket.

17. An apparatus for clarifying liquids including a floc concentration chamber and a sedimentation chamber, means for passing liquid first through the floc concentration chamber and then through the sedimentation chamber, means in the path of the liquid in the floc chamber for agitating and mixing the liquid and for forming and maintaining a blanket of floc particles extending substantially entirely across the line of flow of the liquid through the floc chamber, the liquid after it has passed through the floc blanket being adapted to pass into the sedimentation chamber.

18. An apparatus for clarifying liquids including a floc concentration chamber and a sedimentation chamber, means for passing liquid first through the floc concentration chamber and then through the sedimentation chamber, means in the path of the liquid in the floc chamber for agitating and mixing the liquid and for forming and maintaining a blanket of floc particles extending substantially entirely across the line of flow of the liquid through the floc chamber, the liquid after it has passed through the floc blanket being adapted to pass into the sedimentation chamber, and manually adjustable means for withdrawing floc from the up-stream side of the floc blanket and discharging it separately into the sedimentation chamber.

19. A sedimentation and flocculation apparatus including an upwardly expanding flocculation chamber having an influent opening at the bottom and an effluent opening at the top, means independent of the flow of liquid through the chamber for agitating the liquid as it flows upwardly through the chamber, said means being adapted to impart to the liquid, an agitation the intensity of which decreases in the direction of travel of the liquid, and a sedimentation chamber encircling the flocculation chamber, a liquid connection between the flocculation and the sedimentation chambers.

20. A flocculation apparatus including a flocculation chamber, means for passing liquid therethrough, the chamber increasing in cross sectional area in the direction of liquid flow, a sedimentation chamber, a direct and unobstructed connection between the two chambers, means for forming and maintaining a continuous floc blanket in the flocculation chamber extending substantially entirely across the chamber, whereby all of the liquid passing through the chamber is constrained to flow through the floc blanket, said means including means for agitating the liquid independent of the flow of liquid through the chamber and adapted to impart agitation to the liquid at a rate decreasing in the direction of flow.

MARCUS B. TARK.